US007298615B2

(12) United States Patent
Wong

(10) Patent No.: US 7,298,615 B2
(45) Date of Patent: Nov. 20, 2007

(54) COMPUTING DEVICE

(75) Inventor: William Wong, Milton Keynes (GB)

(73) Assignee: High Performance Enterprise Public Limited Company, Milton Keynes (GB)

(*) Notice: Subject to any disclaimer, the term of this patent is extended or adjusted under 35 U.S.C. 154(b) by 380 days.

(21) Appl. No.: 11/138,718

(22) Filed: May 26, 2005

(65) Prior Publication Data

US 2005/0276015 A1    Dec. 15, 2005

(30) Foreign Application Priority Data

May 28, 2004 (GB) ................................ 0412033.3

(51) Int. Cl.
*G06F 1/20* (2006.01)
(52) U.S. Cl. .................... 361/687; 361/697; 361/709; 312/223.3
(58) Field of Classification Search ........ 361/683–697, 361/703, 709, 720, 724, 735; 312/222.1, 312/223.2; 165/80.3, 121–126, 104.33
See application file for complete search history.

(56) References Cited

U.S. PATENT DOCUMENTS

| | | | | |
|---|---|---|---|---|
| 5,018,052 A | * | 5/1991 | Ammon et al. ............. | 361/827 |
| 5,505,533 A | * | 4/1996 | Kammersqard et al. .... | 312/236 |
| 5,526,228 A | * | 6/1996 | Dickson et al. ............. | 361/695 |
| 5,835,346 A |   | 11/1998 | Albani et al. ............... | 361/684 |
| 6,034,870 A |   | 3/2000 | Osborn et al. .............. | 361/690 |
| 6,147,862 A | * | 11/2000 | Ho ............................... | 361/685 |

(Continued)

FOREIGN PATENT DOCUMENTS

JP    2003 133774 A    5/2003

OTHER PUBLICATIONS

Intel Corporation: "FlexATX Thermal Design Suggestions, Version 1.1", May 19, 2000, Internet, Embodiment re Desktop #1.

(Continued)

*Primary Examiner*—Jayprakash Gandhi
*Assistant Examiner*—Anthony Q Edwards
(74) *Attorney, Agent, or Firm*—Harrington & Smith, PC

(57) ABSTRACT

A media centre computing device includes a housing, and a mains-powered personal computer motherboard including a main processor with a heatsink disposed at or near to one edge of the motherboard and connectors disposed at an adjacent edge of the motherboard, the motherboard being secured in the housing with the connectors contacting the rear face of the housing and the main processor being disposed adjacent a first side face of the housing and in the proximity of a first vent formed therein. The device also includes a power supply secured to the housing and proximate to rear and second side faces of the housing, and a fixed mass-storage device and a removable memory media drive located one above the other in the volume between the power supply and the front face of the housing. Media being transportable to and from the removable memory media drive though an aperture in the front face of the housing. This allows a computer with a PC motherboard and other main components to be accommodated in a small housing and be easily usable with a television set.

11 Claims, 5 Drawing Sheets

U.S. PATENT DOCUMENTS

| | | | |
|---|---|---|---|
| 6,229,700 B1 | 5/2001 | Liu et al. | 361/687 |
| 6,324,056 B1 | 11/2001 | Breier et al. | 361/687 |
| 6,464,578 B1* | 10/2002 | Chin et al. | 454/184 |
| 6,678,157 B1* | 1/2004 | Bestwick | 361/695 |
| 7,068,505 B2* | 6/2006 | Kosugi | 361/690 |
| 7,097,047 B2* | 8/2006 | Lee et al. | 211/26.2 |
| 2003/0123832 A1* | 7/2003 | Adapathya et al. | 385/135 |
| 2003/0156385 A1* | 8/2003 | Askeland et al. | 361/687 |

OTHER PUBLICATIONS

Intel Corporation: "MicroATX Small System Thermal/Acoustic Design Guide, Version 1.1" Nov. 2002, Internet, Embodiment re 13-Liter Chassis.

Alien Rock: "Silverstone Slim Desktop Case SST-LC02", Online, Feb. 2, 2004, pp. 2-4.

* cited by examiner

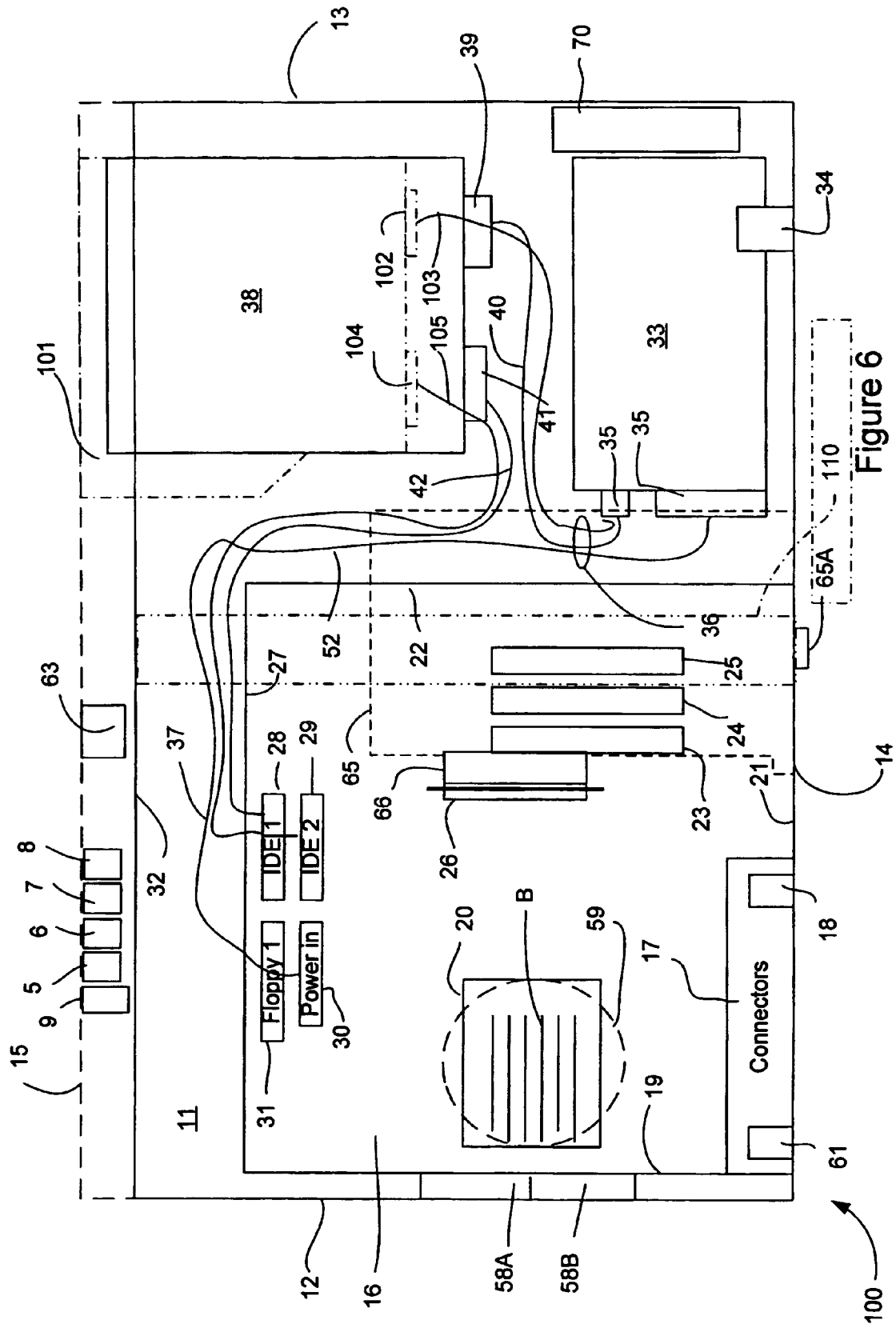

COMPUTING DEVICE

FIELD OF THE INVENTION

This invention relates to a computing device.

BACKGROUND OF THE INVENTION

Personal computing devices typically take one of three forms. Tower and desktop personal computer (PC) systems include a relatively large housing in which is included a motherboard, one or more removable media drives, typically DVD and/or CD drives, and one or more mass-storage devices, more commonly termed hard disk drives. The motherboard supports a main processor fitted with a heatsink, which typically is cooled using a fan. The motherboard typically has supported on it a number of connectors for the connection of external devices, such as connectors for a monitor, one or more external drives, input devices such as a keyboard and a mouse, and the like. The motherboard typically is supported within the housing such that the connectors protrude through suitable holes formed in the rear of the housing, allowing external devices to be connected thereto. The motherboard also includes a number of connectors for the connection of internal devices, such as RAM and graphics cards, sound cards and the like. These devices normally extend in a plane perpendicular to the plane of the motherboard. Such PCs are powered by a cable connection to a mains electricity supply.

Modern PCs typically use one of the four most common motherboards, named ATX, ITX, BTX and Micro ATX. There are numerous advantages associated with using these motherboard types, including the cost effectiveness associated with manufacturing in large numbers. They typically are capable of supporting a wide range of computing power, and allow the connection of numerous additional components to the motherboard main processor. The Micro ATX and ITX motherboards have the same mounting holes, so one housing design can be used with either type of motherboard. The ITX, and Micro ATX motherboards also are available readily and cheaply worldwide, and are relatively small, having dimensions of 244 mm square. The new Flex ATX motherboard has maximum dimensions 229 mm by 191 mm.

The functions of tower and desktop PCs can be provided in portable, battery-powered devices, commonly known as laptop computers, notebooks or notepads, which constitute the third form of PC. The components making up these laptop computers are different to those making up tower and desktop PCs, in particular by being smaller, lighter and by having significantly lower power consumption and heat generation. This applies particularly to the main processor. Laptop computers usually have less connectivity than tower or desktop PCs, since connectors can consume a relatively large amount of volume within a housing. As a consequence of the size and power consumption requirements of components for laptop computers, they tend to be more expensive than corresponding tower and desktop PC components, and they also tend to be less compatible with other PC components than corresponding tower and desktop PC components. Laptop main processors for example tend to cost about twice as much as corresponding desktop PC main processors. Because the power resources available to laptop computers is less than that available to tower or desktop computers, laptop computers tend to have less powerful processors than corresponding tower or desktop PCs.

Although it is known to provide PCs with outputs suitable for connection to television sets, it still is much more common to use a dedicated monitor instead. This is thought by the inventors to be in part because of the size of conventional PCs, which are too large to lend them easily to being placed under a television set along with a VCR or DVD player. The fans required for PCs can also make them sufficiently noisy to constitute an irritation when being used with a television set. Although laptop computers have a size more suitable for placement beneath a television set, they do not tend to have television output connectors, since they are designed primarily for portable use, and they also are relatively expensive.

SUMMARY OF THE INVENTION

It is an aim of the invention to provide a cost effective computing device which is easily usable with a television set.

According to an embodiment of the present invention, there is provided a computing device that has a housing having upper, lower, first and second side faces, and front and rear faces. The computing device further has a mains-powered personal computer motherboard of the type including a main processor with a heatsink, both of which are disposed at or near to a first edge of the motherboard and connectors disposed at a second edge of the motherboard. The second and first edges are adjacent to one another, the second and a third edge of the motherboard are adjacent to one another, and the third edge is opposite the first edge. The motherboard is secured in the housing with the connectors contacting the rear face of the housing and the main processor is disposed adjacent the first side face of the housing and in the proximity of a first vent formed therein. A power supply is secured to the housing between the third edge of the motherboard and the second side face of the housing, and is proximate to the rear and second side faces of the housing. A fixed mass-storage device and a removable memory media drive are located one above the other, between the third edge of the motherboard and the second side face of the housing, and in the volume between the power supply and the front face of the housing, wherein the media is transportable to and from the removable memory media drive though an aperture in the front face of the housing.

This computing device can use an off-the-shelf tower or desktop PC motherboard, so can provide all the computing power associated with such PCs, yet can be fitted into a housing small enough to fit easily alongside or underneath a television set. The embodied device is in a housing approximately the same size as a typical home slimline DVD player, or any slimline audio/video component.

In the embodiments, the motherboard is a Micro ATX, an ITX or a Flex ATX motherboard. These motherboards are characterised in that are available off-the-shelf, in that they are mains-powered, i.e. are not suitable for use in portable, battery-powered computing devices, and in that they have a main processor with a heatsink disposed at one edge of the motherboard and connectors disposed at an adjacent edge of the motherboard. The invention is applicable to ATX, Micro ATX and ITX and Flex ATX motherboards and to other standardised, off-the-shelf and mains-powered motherboards which include a main processor with a heatsink disposed at one edge of the motherboard and connectors disposed at an adjacent edge of the motherboard. A mains powered motherboard could be considered as one having a maximum operational power consumption exceeding 50

Watts, or one which it is not practicable to operate in normal use for a reasonable period of time using a battery suitable for portable computing use.

There is no need to provide a separate monitor for use with the computing device, since it can be used with an existing television set, thereby reducing the costs of making the device interface appropriately with a user.

The computing device of the invention can also be provided with the functions of a DVD player, thereby eliminating the need for a separate device. Because the device has in-built computing capability, providing it with a tuner or a digital television signal input can allow it to be provided relatively easily with the function of a hard-disk recorder. If the removable memory media drive is able to record data onto media, for example by being a DVD-R or DVD-RW drive, then the device can also be provided with the function of a DVD recorder or DVD rewriter with relatively little additional software. The computing device can also be capable of the functions of conventional CD players, with the additional capability to handle MP3, DIVX, MPEG-3 and -4 and many other formats.

Use of the device as a PC can be achieved easily by the connection of a keyboard and mouse. Preferably, these are connected wirelessly, using Bluetooth or alternatively an infra-red receiver located externally or in the front panel of the housing. The device can be used as a PC at distances from the display device (the television) that would normally be found when watching television normally, so it may not be necessary for any change in the seating location of a user. A wireless keyboard is easily supported on a user's lap. Microsoft Corporation has released their Media Center operating software, remote, and wireless keyboard, which will allow simple switching between the functions of the computing device Where the motherboard includes power connectors disposed at an edge adjacent the front face, cabling connecting the motherboard power connectors preferably runs along part of that edge between the motherboard and the front face, and along the edge of the motherboard opposite the edge including the main processor to the power supply. This allows power to be provided to the motherboard whilst allowing the power supply to be located in the volume between the storage device and the rear face of the housing. This also allows the motherboard to be placed only a short distance, sufficient to allow the cabling to pass, from the power supply and the fixed mass-storage device or the removable memory media drive.

Preferably the heatsink includes plural generally parallel blades extending at least approximately in the direction of the vent. This allows heat to be conducted away from the processor and heatsink arrangement directly to atmosphere, without first passing through any substantial volume within the housing, thereby minimising the amount by which other components within the housing become heated by the processor.

Advantageously the device further comprises a cooler fan operable to blow air from a cooler vent in the top face of the housing directly onto the heatsink. This provides additional efficiency of dissipation of heat from the heatsink to atmosphere. Preferably, the fixed mass-storage device is located adjacent the bottom and second side faces of the housing, and the removable memory media drive is located above the fixed mass-storage device adjacent the top face of the housing. This is advantageous since it can allow cabling to connect the power supply and the motherboard without preventing the position of the removable memory media drive to be dictated by the position of the cabling.

Advantageously the device further comprises a graphics card disposed in a plane parallel to the plane of the motherboard, the graphics card being connected to the motherboard by a riser. This can allow the functionality provided by a conventional tower or desktop PC graphics card to be provided within a relatively short housing. A conventional connection of a graphics card would ordinarily result in the card protruding a significant height from the motherboard, increasing significantly the size of the housing. Preferably, the graphics card includes a television output connector arranged to contact the rear face of the housing.

The processors used in tower and desktop PCs tend to be very powerful, in terms of processor speed and also in terms of processor bit width. To maximise processor speed for a given CMOS process size requires relatively high voltages, which results in a correspondingly high power consumption and heat generation. Heatsink and fan arrangements need to be used to remove heat from the processor, to prevent it from overheating. In tower and desktop PCs, heatsink and fan arrangements tend to strike a balance between cost and noise generation; cheaper arrangements involving more noisy fans than more expensive arrangements. The relatively large internal volume of desktop and tower PCs present few problems for heat removal, but smaller volumes could present heat removal problems. It is an aim of a secondary aspect of the invention to provide an arrangement which can allow a processor having a relatively level of heat generation to be operationally housed in a relatively low volume housing.

Advantageously, the heatsink includes plural generally parallel blades extending at least approximately in the direction of the first vent, and a graphics card is disposed in a plane parallel to the plane of the motherboard, the graphics card being connected to the motherboard by a riser card, the riser card being disposed at least approximately in line with the heatsink in the direction in which the blades extend. This can result in the deflection of air heated by the heatsink and blown by a fan by the riser. Providing a second vent in the upper face of the housing at the position of a face of the riser which faces the heatsink is advantageous since this heated air can be deflected directly to atmosphere.

The device may include a duct extending between the heatsink and the first vent. This enhances the flow of air from the heatsink directly to atmosphere. When a cooler fan is used, the presence of the duct can obviate the need for an additional fan specifically for blowing air from the heatsink to atmosphere.

Whether or not there is a duct, at least one fan may be located between the heatsink and the vent, the fan being operable to blow air from the vicinity of the heatsink through the first vent. Such can provide improved venting of heated air.

BRIEF DESCRIPTION OF THE DRAWINGS

Embodiments of the invention will now be described by way of example only with reference to the accompanying drawings, of which:

FIGS. 5 and 6 are schematic plan drawings of the internal components of respectively second and third embodied computing devices according to the invention.

DETAILED DESCRIPTION OF THE INVENTION

Figure 1:
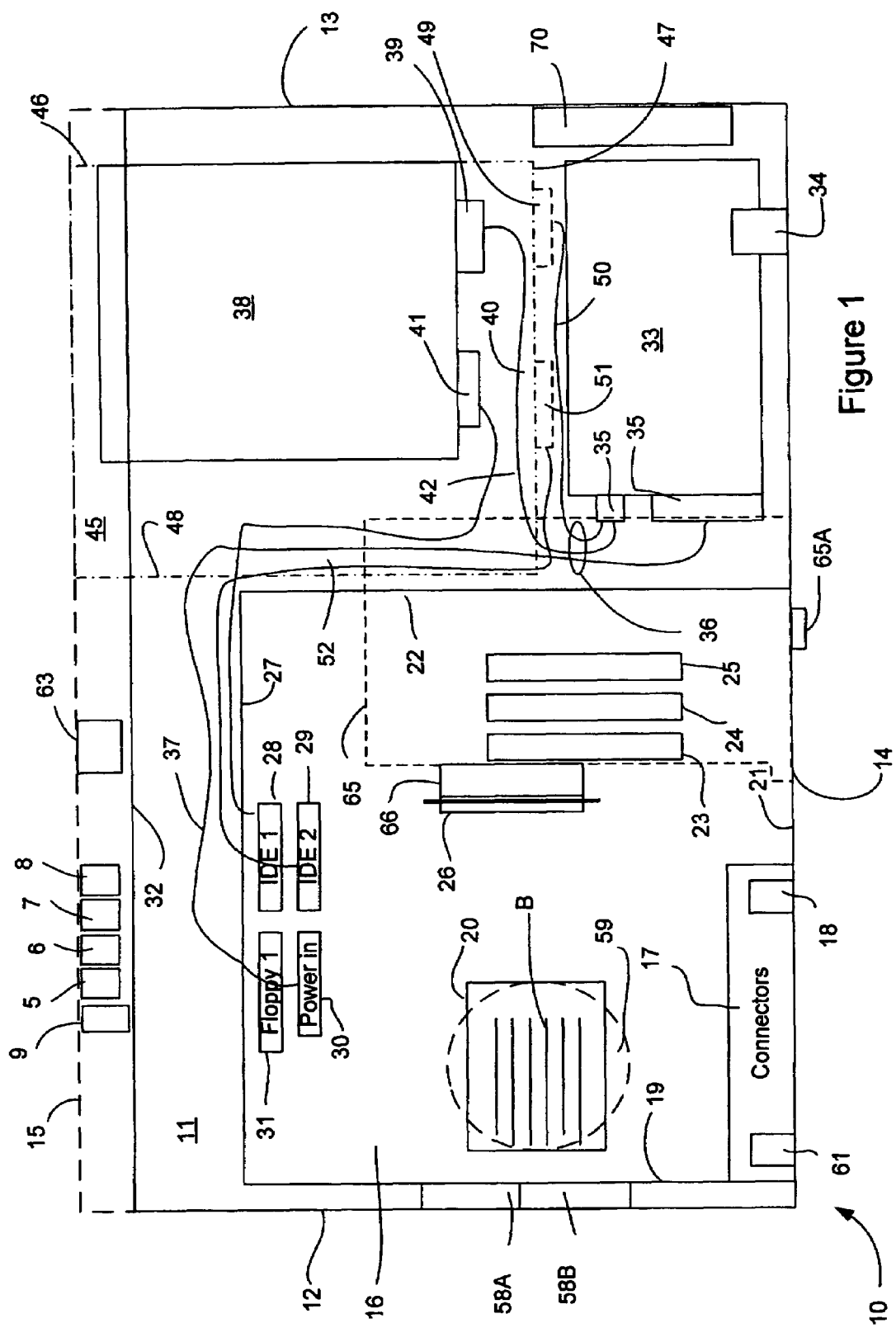
FIG. 1 is a schematic plan drawing of the internal components of a first embodied computing device according to the invention.

FIG. 1 illustrates in plan view internal components of a computing device 10 according to the invention. A housing includes a floor pan 11, which constitutes a lower face, left and right side faces 12 and 13 and a rear face 14. The floor pan 11 may be formed integrally with one or more of the left and right side and rear faces 12 to 14, or some or all may be formed separately and subsequently connected together. The exact form of the housing is not critical on the invention, so long as it can form a chassis for the device 10. A front panel 15 is connected to the floor pan 11 and to the left and right side faces 12 and 13. As is usual with housings for DVD players and the like, the front panel 15 extends supra the footprint of the floor pan 11. It also includes a treated metal portion (not shown) designed to prevent unwanted electromagnetic emissions.

Secured to the floor pan 11 by some screw fixtures (not shown) is a motherboard 16. The motherboard 16 is located approximately 10 mm from the first side face 12, and is located up against and flush with the rear face 14 of the housing. The motherboard 16 is a Micro ATX motherboard, a Flex ATX motherboard or an ITX motherboard. Accordingly, it includes along a second edge 21 a series of connectors 17, including a digital out connector 18 and a number of other connectors, including two or more USB connectors, a network connector, mouse and keyboard input connectors, a parallel port, two serial ports, line in and microphone (not shown), which are in register with apertures in the rear panel 14 so as to allow connection with external devices. The line out connector 18 is for connection directly to a digital television set or a PC monitor, thereby to provide an audio output. The portion of the motherboard 16 including the connector 17 is aligned along the rear panel 14 and adjacent a first edge 17 of the motherboard. The first edge 17 is adjacent to the left side panel 12.

First to fourth USB ports 5-8 and an IEEE 1394 port, also known as a Firewire port, 9 are supported on the front panel 15 of the housing. This provides improved convenience to the user. The USB ports 5-8 and the Firewire port 9 are located behind a hinged flap (not shown), which hides the ports when they are not in use, i.e. when no cables are connected to them. This provides improved appearance, and also provides protection for the USB ports 5-8 against the infiltration of unwanted dirt and moisture. The USB ports 5-8 and the Firewire port 9 are connected to the motherboard using suitable cabling (not shown).

The USB ports 5-8 allow devices to be connected to the computing device without a user needing to attach cables to connectors at the rear of the housing. Such devices can include gaming controllers (also known as gamepads or joysticks), external harddrives, printers, card readers, pen drives, MP3 players, camcorders, DV camcorders, PDAs and the like. It will be appreciated that this then significantly enhances the functionality of the computing device 10. The Firewire port 9 is particularly suitable for camcorders and DV camcorders, but can be used to effect by numerous other external devices.

Figure 3:
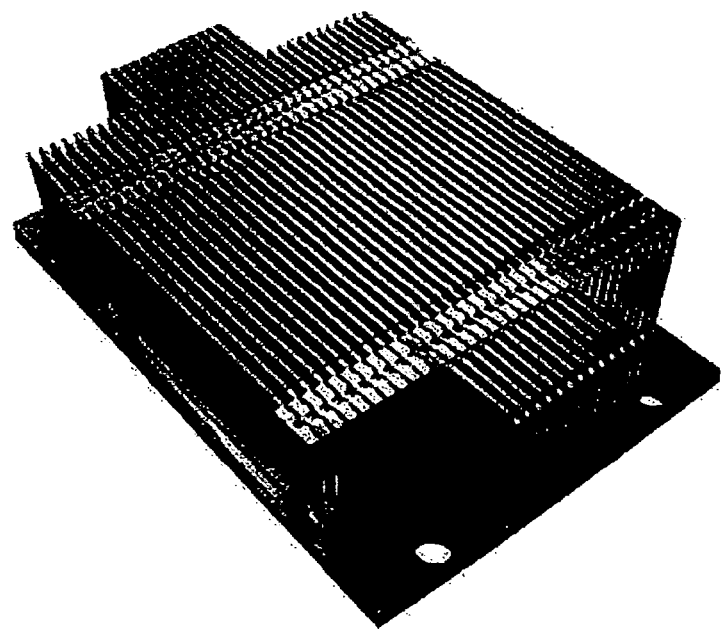
FIGS. 3 and 4 are perspective views of alternative heatsinks forming part of the FIG. 1 computing device.
Figure 4:
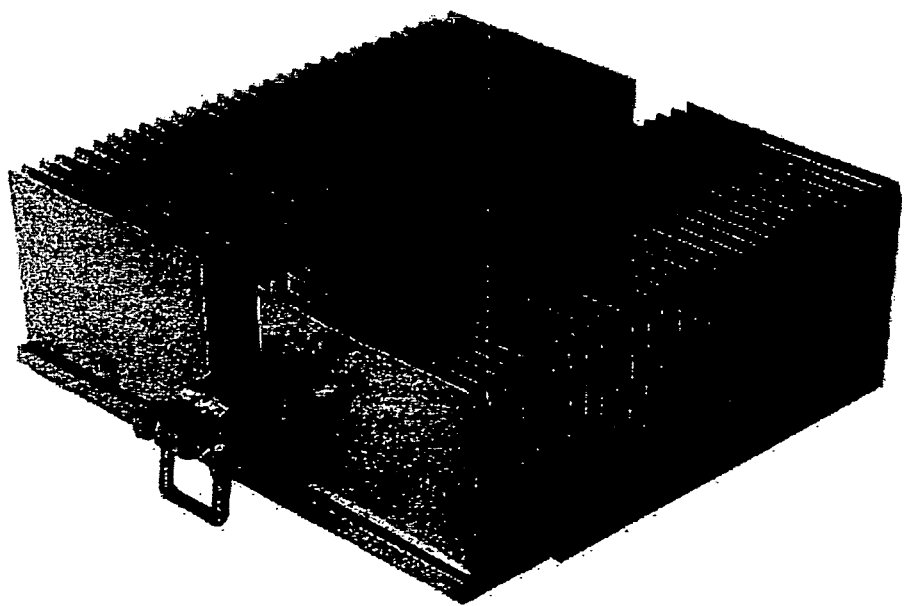

The motherboard 16 includes approximately halfway along the first edge 19 a CPU (not shown), or main processor, on which is mounted a heatsink 20. In FIG. 1, the CPU is hidden beneath the heatsink 20. An end of the heatsink 20 is separated from the first edge 19 of the motherboard 16 by a short distance, for example 8-15 mm. The end of the heatsink thus is separated form the side face of the housing by 18-25 mm. The heatsink 20 includes a number of planar metal blades B which extend in a plane perpendicular to the page and parallel to the second edge 21 of the motherboard. Example heatsinks are shown in FIGS. 3 and 4.

A third edge 22 of the motherboard 16 is located opposite the first edge 19. In the quadrant of the motherboard 16 which is adjacent the second and third edges 21, 22 are located first, second and third PCI connector blocks 23, 24, 25. Located just towards the centre of the motherboard 16 from the first PCI connector 23 is an AGP connector 26. The AGP connector 26 constitutes an accelerated graphics port. Located adjacent a fourth edge 27 of the motherboard 16 are first and second IDE (Integrated Drive Electronics) ports 28, 29, a power in connector 30 and a floppy disk drive connector 31. The connectors 17, the PCI connectors 23 to 25, the AGP connector 26, the IDE connectors 28, 29, the power connector 30 and the floppy disk drive connector 31 are all standard components of Micro ATX, Flex ATX and ITX motherboards, so their operation and exact location need not be described in detail here.

The fourth edge 27 of the motherboard 16 is separated from the corresponding edge 32 of the floor pan 11 of the housing by a distance of approximately 20 mm. If the motherboard 16 is a Micro ATX or an ITX motherboard, it typically has dimensions of 244 mm square, which results in the length of the first and second side faces 12, 13 of floor pan 11 being approximately 268 mm. Using a Flex ATX motherboard can result in a narrower housing.

A power supply 33 is located in the region of the housing adjacent the rear panel 14 and the second side panel 13. The power supply 33 is arranged with its lengthwise axis extending parallel to the rear panel 14. The power supply 33 is separated from the rear panel 14 by a distance of approximately 10 mm, and is separated from the second side panel 13 by a distance of approximately 20 mm. The power supply 33 is secured to the floor pan 11 by some screw fixings (not shown). The power supply 33 includes a mains connector 34, which extends into the rear panel 14 so as to allow connection of a power cable (not shown) thereto.

The power supply 33 has a dimension of 128 mm in the direction parallel to the rear face 14 of the housing, and is 78 mm long in a direction parallel to the second side face 13 of the housing. The height of the power supply is approximately 38 mm. The power supply 33 may take any suitable mains voltage. The power supply 33 is arranged to provide a suitable low voltage DC supply from a mains voltage anywhere in the range of 90 to 240V and a frequency of 50 or 60 Hz. Such power supplies are available off-the-shelf. Preferably, the power supply 33 is a custom power supply with a custom harness 36, so as to allow the mains connector 34 to be located on the rear face 14 of the housing and to allow the harness 36 to be located on an edge 35 of the power supply closest to the motherboard 16.

A power supply fan 70 is arranged between the power supply 33 and the second side face 13 of the housing, which has a corresponding vent (not shown) formed therein. The power supply fan 70 is arranged to blow air from the atmosphere outside the housing over the power supply 33 and from there into the volume within the housing. The power supply 33 may be surrounded above and to the side opposite the rear face 14 of the housing by an electrical insulative cover (not shown), to improve the movement of air through the power supply as well as preventing accidental short circuits between the chassis and the power supply components. The power supply fan 70 preferably is 50 mm in diameter, although it can take any suitable form.

Located along an edge 35 of the power supply 33 which is opposite to the second face 13 of the housing are a number of wires which together form the harness 36. In the Figure, the wires of the harness 36 are illustrated schematically as a single wire for each set of connecting wires. The harness 36 includes first wires 37 which extend along the third face 22 of the motherboard 16 in the same plane as the motherboard before turning 90° and passing along the side of the fourth face 27 of the motherboard. At the end of the first wires 37 are a connector (not shown) which connects with the power in connector 30 of the motherboard. The first wires 37 pass along the side of the fourth face 27 of the motherboard 16 in substantially the same plane thereas, before rising over the fourth edge to meet the power in connector 30.

A hard disk drive 38 is located within the area of the housing adjacent to the second side face 13 and the front face 15. The hard disk drive 38 has dimensions approximately 145 mm in a direction parallel to the second face 13 by 102 mm in a direction perpendicular to the second face. The height of the hard disk drive 38 is approximately 26 mm. The hard disk drive 38 is secured to the floor pan 11 of the housing by a metal bracket (not shown). The hard disk drive 38 can be a standard component, having any suitable amount of storage. The hard disk drive 38 includes at its face opposite the front face 15 of the housing a power connector 39, which is connected by a wire 40 to the harness 36 of the power supply 33. The hard disk drive 38 also includes on the same face a connector 41 which connects with the first IDE connector 28 by way of second wires 42, to allow the transfer of data between the hard disk drive 38 and components on the motherboard 16. To this end, it is advantageous that the second wires 42 pass along the third and fourth edges 22, 27 of the motherboard 16 along with the first wires 37.

Located on top of the hard disk drive 38 is a DVD drive 45. The DVD drive 45 includes a first edge 46 which extends parallel to the second side face 13 of the housing and is substantially aligned with the corresponding edge of the hard disk drive 38. A rear face 47 of the DVD drive 45 is separated by a distance of a few millimetres from the power supply 33. An edge 48 of the DVD drive 45 opposite to the first edge 46 is separated from the third edge of the motherboard 22 by a distance of a few millimetres. However, since the DVD drive 45 is located above the hard disk drive 38, the DVD drive is located in a different plane to the motherboard 16. This allows wires forming part of the harness 36 to pass beneath the DVD drive 45 without interference therebetween. Third wires 40 connecting the hard disk drive 38 and the power supply 33 also run beneath the DVD drive 45. The DVD drive 45 includes on the face 47 adjacent the power supply 33 a power connector 49. Fourth wires 50 forming part of the harness 36 connect the power supply 33 to the power connector 49 of the DVD drive 45. Depending on the location of the connectors 49 on the DVD drive 45, the fourth wires 50 may pass alongside the power supply 33, or they may pass above the power supply.

The DVD drive 45 also has a connector 51, which is connected by fifth wires 52 to the second IDE connector 29 on the motherboard 16, so as to allow the transfer of data between components on the motherboard and the DVD drive 45.

Advantageously, the fifth wires 52 ran with the first wires 37 and the second wires 37 along the third and fourth edges 22, 27 of the motherboard 16.

The length of the various cables depends on the position on the motherboard 16 of the connectors to which the cables must extend. Since the positions of these connectors depends on the particular motherboard selected for use, it is advantageous to select for all of the cables lengths which are sufficiently long, but no longer, to allow connection to a connector which is located on the motherboard 16 as far as is allowable from the device at the other end of the relevant cable.

In this embodiment, the DVD drive 45 is a standard size 5¼" DVD drive. Such DVD drives are available off-the-shelf for inclusion in desktop and tower PCs. As such, the DVD drive 45 is mass produced and thus relatively inexpensive. The DVD drive 45 may be a read-only drive, or alternatively it could be a DVD recorder or a DVD rewriter drive. The combined height of the hard disk drive 38 and the DVD drive 45 gives rise to a housing height of 75 mm being particularly appropriate. The 75 mm housing height determines the height of the front panel 15, as well as the first and second side panels 12, 13 and the rear panel 14.

The front panel 15 of the housing is provided with an aperture (not shown), which allows DVDs to be passed into and out of the DVD drive 45. The front panel 15 also is provided with a display (not shown), such as an LCD or matrix display, as well as DVD player (or recorder) control switches (not shown).

First and second fans 58A, 58B are located adjacent each other and between the end of the blades B of the heatsink 20 and a vent (not shown) formed in the first side face 12 of the housing. The vent coincides with the locations of the fans 58A, 58B. The first and second fans 58A, 58B are powered by the power supply 33, and operate to blow air away from the CPU and heatsink through the first side face 12 of the housing to atmosphere. The first and second fans 58A. 58B are secured in place, either to the first side face 12 or the floor pan 11 of the housing. The first and second fans 58A, 58B preferably are low-noise fans. The inventors consider that 40 mm fans having a flow of 9.7CFM each are suitable in most computing device designs. Fans 40 mm across, such as fans produced by Delta Electronics Inc (www.delta-.com.tw), may be suitable. The same fan type may be used for the power supply fan 70, although a different fan is preferred to be used instead, as described above.

If a computing device is required to be provided with advanced graphics capability, it can be provided with a graphics card 65 connected to the AGP connector 26, as shown in FIG. 1. The graphics card 65 can be of any suitable type. In this embodiment, the graphics card 65 provides video out signals at S-video, VGA and DVI connectors, shown at 65A. These connectors 65A are operable to provide high quality graphics to a suitable television set, analogue or digital, or to a PC monitor. The connectors 65A are in register with suitable apertures in the rear panel 14.

The graphics card 65 can be provided with a television tuner (not shown), which may be of the analogue type but preferably is digital. In this case, it may include an S-video in connector and/or a CATV (cable TV) connector (not shown). Here, the satellite or cable selector discussed above may be omitted, since the tuner in the graphics card 65 can instead allow the computing device 10 to be provided with hard-disk or DVD recorder functionality. One form of output connector which the graphics card may include is an 8 pin S-video-like female connector providing both audio and video signals. In this case, an external connector (not shown) can be used to provide, from this connector, S-video, RCA audio and RCA video connectors, for connection to a television set or PC monitor. Such an external connector can be relatively small, for example about 20×60×100 mm, allowing it to be located at the back of the computing device 10 without impinging on the convenience of the device.

Instead of the graphics card 65 extending perpendicularly to the plane of the motherboard 16, as is conventional with PCs of the desktop and tower types, the graphics card 65 is connected at one end by a riser 66. At one side, the riser 66 plugs directly into the AGP connector 26. At another side, at 90° to the AGP connector side, it includes a female connector into which is plugged the graphics card 65. Such risers can be purchased from custom PC suppliers. The inventors have found that using a 1.0U riser can place the graphics card so close to the motherboard that the heat generated by the graphics card can have a negative influence thereon. A 2.0U riser however provides sufficient separation from the motherboard whilst not requiring any increase in housing size. The 2.0U riser 66 results in the graphics card 65 being disposed in a plane parallel to the plane of the motherboard 16 and being separated from the motherboard 16 by distance of approximately 30 mm. This allows a conventional PC graphics card, many of which are currently available off-the-shelf, to be used without requiring a larger housing to be provided.

An additional consequence of the use of a 2.0U riser is that sufficient volume is provided between the graphics card 65 and the motherboard 16 to allow one or more of the PCI connectors 23-25 to be connected to an ISP server, a network hub, a 5+1 sound card and/or some other device, for expanding the functionality of the computing device 10.

Once all of the components have been arranged in their housing and the appropriate connections have been suitably made, an upper panel (shown in FIG. 2, described below) is placed on to the computer device 10 and secured thereto, so as to complete the computing device 10. In this embodiment, the housing may have dimensions of 430 mm wide by 268 mm deep by 75 mm high. As such, the computing device 10 is approximately the same size as standard DVD players available today, although of course smaller forms of DVD players are available.

Figure 2:
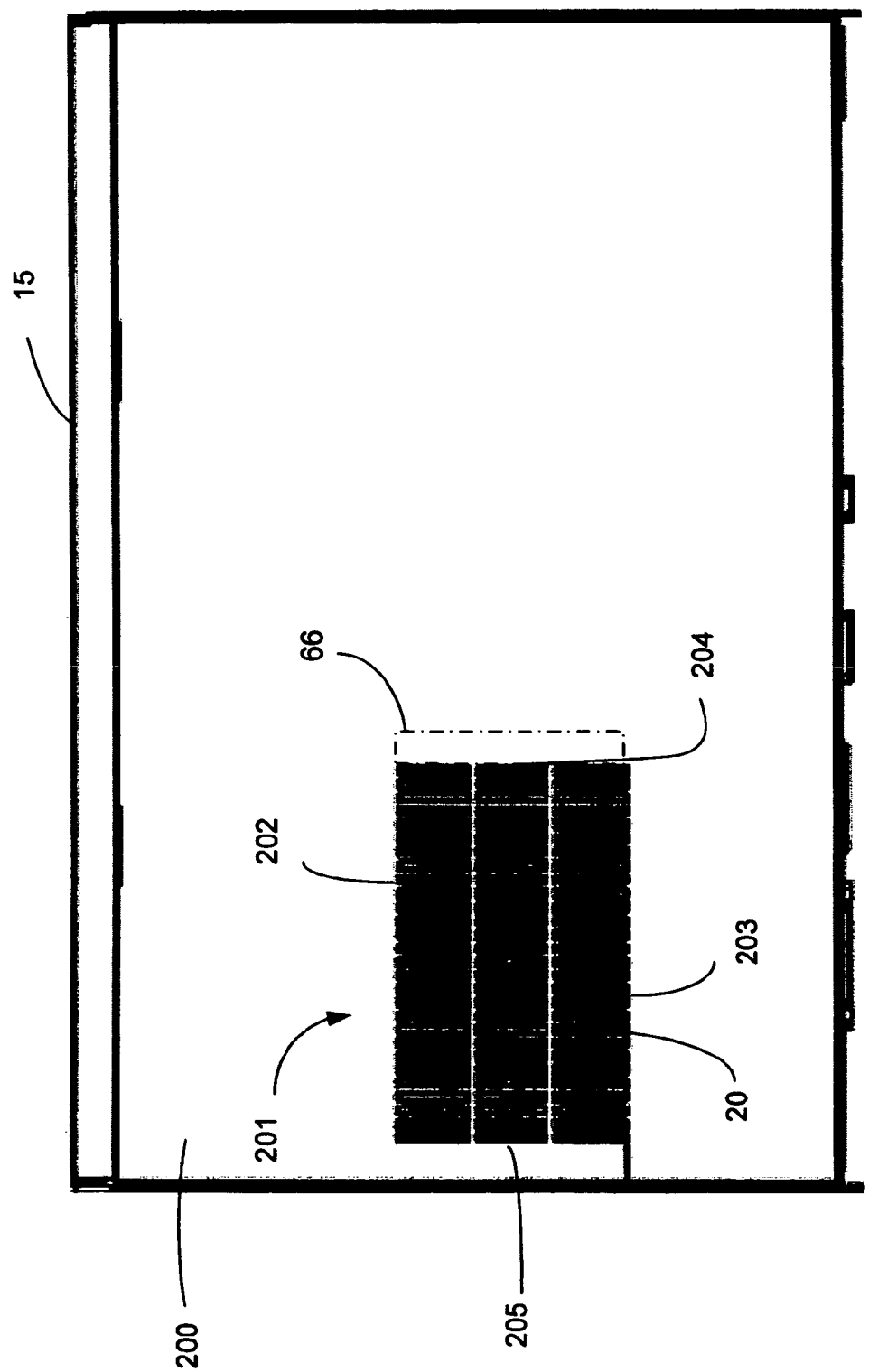
FIG. 2 is a schematic view of an upper panel used with the FIG. 1 computing device.

The upper panel is shown in plan view in FIG. 2. Here, the upper panel 200 is shown to include a vent 201. The vent 201 is generally rectangular in shape, and comprises a number of parallel apertures formed in the metal of the upper panel 200, or alternatively a metal mesh inserted into an aperture in the upper panel. Front and rear limits 202, 203 of the vent 201 are generally level with, that is they generally coincide with, the edges of the riser 66. The vent 201 thus is as wide as the riser 66. A rightmost limit 204 generally coincides with the position of the riser 66. A leftmost limit 205 extends to a position about 15 mm from the edge of the upper panel 200. The riser 66 is shown in outline, although it is not visible through the vent 200 when viewed from directly above. In FIG. 2, the location of the heatsink 20 can be seen.

A third fan 59 is placed in the plane of the Figure on top of the heatsink 20. The third fan 59 also is powered by the power supply 33. However, the third fan 59 is arranged to blow air from atmosphere through the vent 201 in the upper panel 200 of the housing onto the heatsink 20. Accordingly, air is blown into the volume between the blades B of the heatsink 20 by the third fan 58. This air is channelled by the blades B of the heatsink 20 in two directions, namely left and right as shown in the Figure. A large proportion of the air channelled to the right is deflected by the riser card 66 through the vent 201 to atmosphere. This is due to the relative locations of the heatsink 20, the parallel blades B of the heatsink 20 and their direction of alignment, and the location of the vent 201, and is seen to be a significant feature with significant positive consequences. A large proportion of the air channelled to the left is blown to atmosphere by the first and second fans 58A, 58B. This results in very little heating by the CPU of the air in the volume of the housing. Of course, this air is heated to some extent by the power supply 33, but this generates much less heat than the CPU. The first and second fans 58A, 58B also serve to blow air in the general volume of the housing to atmosphere, thereby disallowing heat to build up.

Heatsinks suitable for use as the heatsink 20 are shown in FIGS. 3 and 4. In FIG. 3, an E1U-NPFCS-01 heatsink produced by Cooler Master of Milton Keynes, UK is shown (www.coolermaster.co.uk). As can be seen, this heatsink has parallel blades, which in place on the motherboard extend from left to right, as shown in FIG. 1. This heatsink has a copper base and copper stacked fins, and dimensions of 89×60×25 mm. It is designed for Intel (RTM) Xeon (Prestonia) (RTM) CPUs.

In FIG. 4, a Cooler Master EP3-SLMFC heatsink is shown. This is designed for use with Intel Xeon PIII (RTM) and AMD Athlon MP (RTM) CPUs.

The particular heatsink selected for use will depend on the CPU, on the thickness of the third fan 59, and on the space available above the CPU in the housing. 1U heatsink may be particularly suitable because of their dimensions. The inventors consider the Cooler Master EIU-N7BCC-03 heatsink to be particularly suitable. This heatsink includes an integral fan on its uppermost surface, which constitutes the third fan 59.

Optionally, a satellite or cable television signal decoder (not shown) is included, for example by being connected at any suitable location on the motherboard 16. To this end, the connectors 17 may include an antenna input connection 61, by which modulated television signals can be received at the computing device 10. The inclusion of the satellite or cable signal decoder and the antenna connector 61 allows the computing device 10 to be provided with signals usable to produce television or radio programs from received broadcast signals. This has two significant consequences.

Firstly, connection to a cable television source allows the provision of Internet access, potentially of a significantly higher speed than available with conventional 56 kbps modems, in a convenient manner without necessarily requiring a connection to a telephone line. Thus, a user of the computing device 10 may be provided with the ability to access the worldwide web and to use other resources associated with the Internet without connection to a telephone line.

Secondly, providing the computing device 10 with suitable software allows it to serve as a hard disk recorder. Alternatively or in addition, the computing device 10 can be provided with software to allow it to function as a DVD recorder. DVD and hard disk recorder equipment is already available for consumer purchase. However, because these devices require a significant amount of processing power and relatively expensive components, hard disk recorders and DVD recorders tend to cost significantly more than DVD players. However, the computing device 10 is provided already with the resources needed to provide hard disk recorder and/or DVD recorder capability, so this functionality can be provided at relatively little additional cost.

The Microsoft (RTM) Media Center software, in its present or any future form, can be used to provide the hard disk recorder and DVD recorder functionality. Instead, this functionality may be provided by any other suitable software A wireless keyboard (not shown) and a wireless mouse (not shown) can be connected to the computing device 10, so as to enable the computing device to be used in the same way as conventional personal computer. To this end, the front panel 15 preferably includes a transducer 63. In its simplest form, the transducer 63 is an infrared receiver, allowing input from a wireless keyboard and a wireless mouse. However, the transducer 63 may instead be a Bluetooth (RTM) transceiver, allowing operation with a Bluetooth keyboard and a Bluetooth mouse. Providing a Bluetooth transceiver 63 also has the advantage of allowing the wireless connection of printers and other peripheral devices. Accordingly, the transducer 63 may allow the transfer of data from the computing device 10 to a peripheral device, as well as the provision of control signals from external peripheral devices to the computing device 10. Alternatively the infra red transducer is an external device, which is connected by way of one of the USB ports 5-8 at the front of the housing or by way of a USB port included in the connectors 17.

Figure 5:
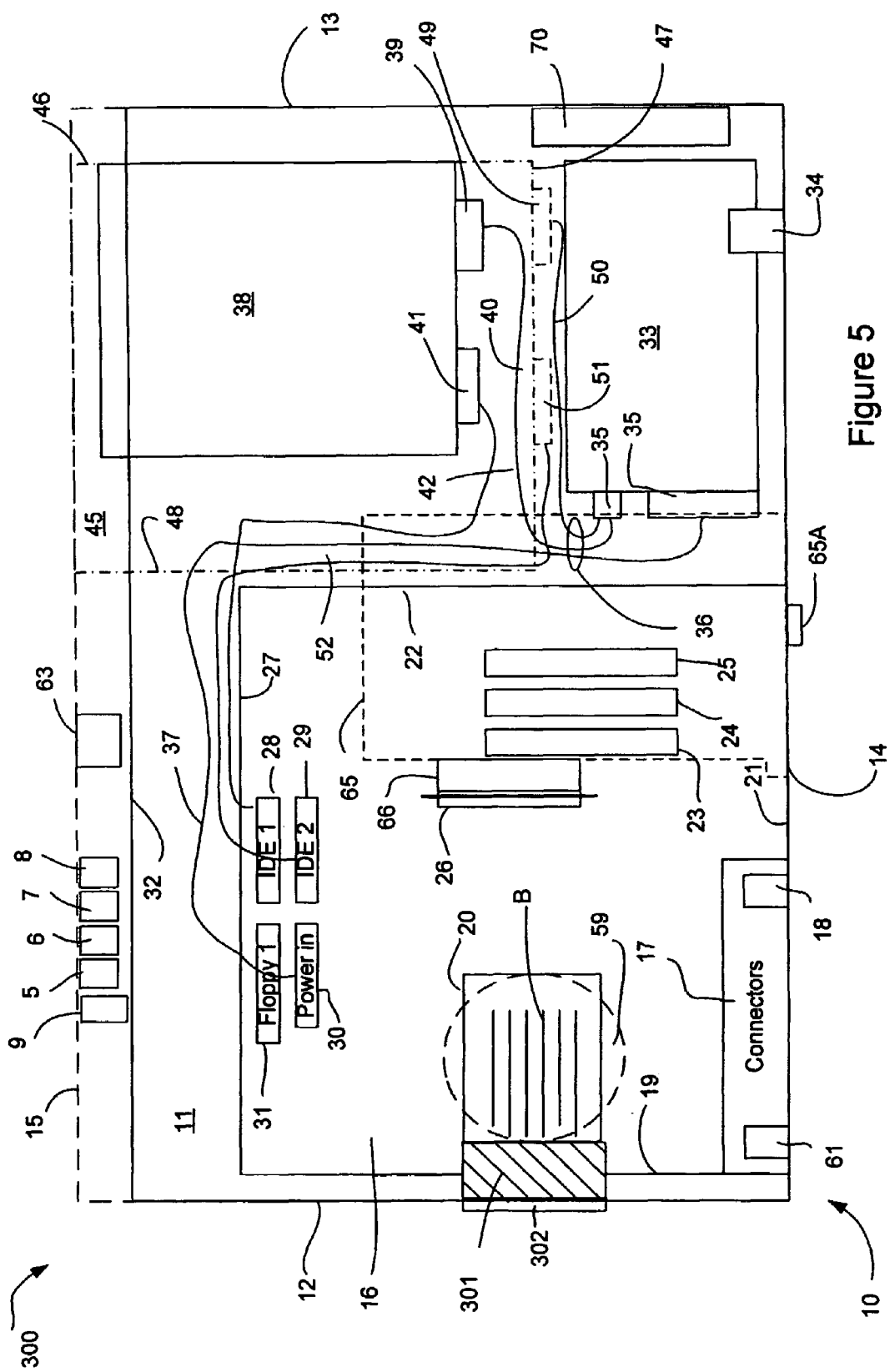

An alternative computing device 300 is shown in FIG. 5. Here, the first and second fans 58A and 58B are omitted. Instead, fan ducting 301 is arranged between the heatsink 20 and a vent 302 formed in the side face of the housing. The ducting 301 constitutes a channel in which air blown into the volume between the blades B of the heatsink can flow in a contained manner directly to atmosphere. The inclusion of a fan in the side face of the housing can be avoided since the third fan 59 blows air through the heatsink 20 through the channel provided by the ducting and to atmosphere. The ducting 301 prevents all except a small proportion of the air forced out to the left of the heatsink 20 from being retained in the volume of air contained by the housing. This is advantageous since is utilises fewer fans. Air in the volume contained by the housing is expelled by air blown into the housing by the third fan 59 and by the power supply fan 70. The ducting 301 may take any suitable form, for example a plastic tube, or a rolled plastic sheet. The ducting 301 need not necessarily form an enclosed channel. For example, a plastic cover could be used, with a channel being formed by this and by the uppermost surface of the motherboard 16. The primary requirement of the ducting 301 is that it channels the majority of the air exiting the left side of the heatsink 20 directly through the vent 302.

A further alternative computing device 100 is shown in FIG. 6. Reference numerals are retained from FIG. 1 for like elements. The 5¼" DVD drive 45 is omitted, and a DVD drive 101 from a notebook or laptop computer is included instead. Here, the DVD drive 101 is approximately 130 mm long by 128 mm wide by 14 mm high. Although the DVD drive 101 is 128 mm wide at its widest point, the drive tapers to a width of 102 mm for a portion of its length closest to the power supply 33.

The notebook DVD drive 101 is connected via a power connector 102 and sixth wires 103 forming part of the harness 36 to the power supply 33. The notebook DVD drive 101 also is connected via a connector 104 and seventh wires 105 to the second IDE connector 29.

The use of the notebook DVD drive 101 allows the housing of the computing device to have a height of only 53 mm, which is about the same as so-called slimline DVD players currently available. This also allows more space for the graphics card 45, which can therefore be longer and/or which can be connected to an AGP connector 26 located closer to the third edge 22 of the motherboard 16 than would otherwise be possible. This allows additional design flexibility, and the potential for a less expensive computing device.

However, this does not allow a 2.0U riser 66 to be used with the graphics card 65. The inventors have found that using a 1.0U riser 66 can place the graphics card 65 so close to the motherboard that the heat generated by the graphics card can have a negative influence thereon. The inventors prefer to use a 1.5U riser, at present available only as a custom made product, in this embodiment. This provides sufficient separation from the motherboard whilst allowing a small housing size. The 1.5U riser 66 results in the graphics card 65 being disposed in a plane parallel to the plane of the motherboard 16 and being separated from the motherboard 16 by a distance of approximately 20 mm. This allows a conventional PC graphics card 65, many of which are currently available off-the-shelf, to be used without requiring a larger housing to be provided.

Also shown in this Figure is a metal support bar 110. This is indicated in outline so as not to obscure the other components. The support bar 110 is rigid, and is secured to the chassis at the front and the back and provides an upper support surface immediately below the upper panel 200. This provides mechanical support, and allows equipment to be supported on top of the housing. For example, a television set or a PC monitor could be mounted directly onto the top surface of the upper panel. This further increases the utility of the computing device. Although not shown, this is included in all the embodiments of the invention.

In a further embodiment of the invention (not shown), the depth of the housing, i.e. the length of the sides 13, 14, is increased by a few centimetres and accommodates a full size ATX motherboard. In this embodiment, the hard disk drive 38 may be placed with its longitudinal axis running parallel to the front panel 15, i.e. perpendicular to the hard disk drives of the above embodiments. Here, the hard disk drive and the removable media drive still are located one above the other. A power supply having different dimensions to those illustrated in the above embodiments may be beneficial to as to minimise the volume of the housing.

Although the above described computing devices are particularly suitable for use with television sets, it will be understood that any could be used with a PC monitor instead, if required.

The invention claimed is:
1. A computing device comprising:
a housing having upper, lower, first and second side faces, and front and rear faces, and
a mains-powered personal computer motherboard of the type including a main processor with a heatsink, both disposed at or near to a first edge of the motherboard and connectors disposed at a second edge of the motherboard, the second edge and the first edge being adjacent to one another, the second edge and a third edge of the motherboard being adjacent to one another, the third edge being opposite the first edge, the motherboard being secured in the housing with the connectors contacting the rear face of the housing and the main processor being disposed adjacent the first side face of the housing and in the proximity of a first vent formed therein;
a power supply secured to the housing between the third edge of the motherboard and the second side face of the housing and being proximate to the rear and second side faces of the housing, and a fixed mass-storage device and a removable memory media drive located: one above the other; between the third edge of the motherboard and the second side face of the housing; and in the volume between the power supply and the front face of the housing, media being transportable to and from the removable memory media drive though an aperture in the front face of the housing.

2. A device as claimed in claim 1, further comprising a graphics card disposed in a plane parallel to the plane of the motherboard, the graphics card being connected to the motherboard by a riser.

3. A device as claimed in claim 2, in which the graphics card includes a television output connector arranged to contact the rear face of the housing.

4. A device as claimed in claim 1, in which the heatsink includes plural generally parallel blades extending at least approximately in the direction of the first vent.

5. A device as claimed in claim 1, in which the heatsink includes plural generally parallel blades extending at least approximately in the direction of the first vent, and in which a graphics card is disposed in a plane parallel to the plane of the motherboard, the graphics card being connected to the motherboard by a riser card, the riser card being disposed at least approximately in line with the heatsink in the direction in which the blades extend.

6. A device as claimed in claim 5, comprising a second vent formed in the upper face of the housing and located at the position of a face of the riser which faces the heatsink.

7. A device as claimed in claim 4, comprising a duct extending between the heatsink and the first vent.

8. A device as claimed in claim 4, comprising at least one fan located between the heatsink and the vent and operable to blow air from the vicinity of the heatsink through the first vent.

9. A device as claimed in claim 1, comprising a cooler fan operable to blow air from a cooler vent in the top face of the housing directly onto the heatsink.

10. A device as claimed in claim 1, in which the fixed mass-storage device is located adjacent the bottom and second side faces of the housing, and the removable memory media drive is located above the fixed mass-storage device adjacent the top face of the housing.

11. A device as claimed in claim 1, in which the motherboard includes power connectors disposed at an edge adjacent the front face, and cabling connecting the motherboard power connectors runs between the motherboard and the front face and along the edge of the motherboard opposite the edge including the main processor to the power supply.

* * * * *